(12) United States Patent
Prissok et al.

(10) Patent No.: US 11,999,816 B2
(45) Date of Patent: Jun. 4, 2024

(54) THERMOPLASTIC POLYURETHANE FROM RECYCLED RAW MATERIALS

(71) Applicant: BASF SE, Ludwigshafen am Rhein (DE)

(72) Inventors: Frank Prissok, Lemfoerde (DE); Elmar Poeselt, Lemfoerde (DE); Dirk Kempfert, Lemfoerde (DE); Lionel Gehringer, Ludwigshafen (DE); Juergen Weiser, Ludwigshafen (DE); Matthias Goldbeck, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 884 days.

(21) Appl. No.: 16/980,084

(22) PCT Filed: Mar. 12, 2019

(86) PCT No.: PCT/EP2019/056128
§ 371 (c)(1),
(2) Date: Sep. 11, 2020

(87) PCT Pub. No.: WO2019/175151
PCT Pub. Date: Sep. 19, 2019

(65) Prior Publication Data
US 2021/0017326 A1    Jan. 21, 2021

(30) Foreign Application Priority Data

Mar. 13, 2018   (EP) .................................. 18161504

(51) Int. Cl.
| | | |
|---|---|---|
| C08G 18/50 | (2006.01) | |
| C08F 4/80 | (2006.01) | |
| C08G 18/76 | (2006.01) | |
| C08J 11/04 | (2006.01) | |

(52) U.S. Cl.
CPC ............ C08G 18/5045 (2013.01); C08F 4/80 (2013.01); C08G 18/7671 (2013.01); C08J 11/04 (2013.01); C08J 2375/04 (2013.01)

(58) Field of Classification Search
CPC ... C08G 18/5045; C08G 18/7671; C09J 11/04
See application file for complete search history.

(56) References Cited

U.S. PATENT DOCUMENTS

| | | |
|---|---|---|
| 5,089,571 A | 2/1992 | Bonk et al. |
| 2010/0047550 A1* | 2/2010 | Prissok .............. C08G 18/3206 428/313.5 |
| 2011/0306719 A1* | 12/2011 | Hilmer ................... C08L 75/04 525/440.01 |
| 2013/0212906 A1 | 8/2013 | Goldwasser et al. |
| 2016/0135545 A1 | 5/2016 | Goldwasser et al. |

FOREIGN PATENT DOCUMENTS

| | | |
|---|---|---|
| CN | 101873812 | 10/2010 |
| CN | 103374145 A * | 10/2013 |
| CN | 103756285 A * | 4/2014 |
| DE | 2 035 175 | 3/1972 |
| DE | 43 16 389 A1 | 11/1994 |
| DE | 10 2005 027 861 B4 | 8/2012 |
| DE | 10 2013 012 625 A1 | 2/2015 |
| EP | 0 373 372 B1 | 9/1993 |
| WO | WO 95/14723 A1 | 6/1995 |
| WO | 2009/042599 | 4/2009 |

OTHER PUBLICATIONS

CN-103374145-A_Oct. 2013_English.*
CN-103756285-A_Apr. 2014_English.*
International Search Report dated May 6, 2019 in PCT/EP2019/056128 filed on Mar. 12, 2019, 2 pages.
Kunststoffhandbuch, Polyurethane, vol. 7, Chapter 3.1, Carl Hanser Verlag, 3rd edition, 1993, pp. 58-75, 19 total pages.
Calvo-Correas, T. et al., "Thermoplastic polyurethanes with glycolysate intermediates from polyurethane waste recycling," Polymer Degradation and Stability, vol. 144, 2017, pp. 411-419, 12 total pages.

* cited by examiner

*Primary Examiner* — Michael L Leonard
(74) *Attorney, Agent, or Firm* — Grüneberg and Myers PLLC

(57) ABSTRACT

The present invention relates to a process for producing a thermoplastic polyurethane reacting at least one thermoplastic polyurethane (TPU-1) or a polyurethane mixture comprising a thermoplastic polyurethane (TPU-1) with at least one compound (V1) comprising two hydroxyl groups to obtain a mixture (G-a) comprising a thermoplastic polyurethane (TPU-2) and the reaction of the mixture (G-a) with a mixture (G-b) comprising an isocyanate composition (ZI) comprising at least one diisocyanate and optionally and a polyol composition (ZP) comprising at least one polyol (P2) to obtain a thermoplastic polyurethane (TPU target), wherein the proportion of the employed components (ZI) and (ZP) is matched to the hard segment content of the employed thermoplastic polyurethane (TPU-1), (V1) and the hard segment content of the thermoplastic polyurethane (TPU target). The invention further relates to a thermoplastic polyurethane obtained or obtainable by such a process and to the use thereof for producing extruded, injection molded and pressed articles as well as foams, cable sheathings, hoses, profiles, drive belts, fibers, nonwovens, films, moldings, soles, sporting goods, shoes, plugs, housings, damping elements for the electricals industry, automotive industry, mechanical engineering, 3D printing, medicine and consumer goods.

22 Claims, No Drawings

THERMOPLASTIC POLYURETHANE FROM RECYCLED RAW MATERIALS

The present invention relates to a process for producing a thermoplastic polyurethane by reacting at least one thermoplastic polyurethane (TPU-1) or a polyurethane mixture comprising a thermoplastic polyurethane (TPU-1) with a compound (V1) comprising two hydroxyl groups to obtain a mixture (G-a) comprising a thermoplastic polyurethane (TPU-2) and the reaction of the mixture (G-a) with a mixture (G-b) comprising an isocyanate composition (ZI) comprising at least one diisocyanate and optionally a polyol composition (ZP) comprising at least one polyol (P2) to obtain a thermoplastic polyurethane (TPU target), wherein the proportion of the employed components (ZI) and (ZP) is matched to the hard segment content of the employed thermoplastic polyurethane (TPU-1) and the hard segment content of the thermoplastic polyurethane (TPU target). The invention further relates to a thermoplastic polyurethane obtained or obtainable by such a process and to the use thereof for producing extruded, injection molded and pressed articles as well as foams, cable sheathings, hoses, profiles, drive belts, fibers, nonwovens, films, moldings, soles, sporting goods, shoes, plugs, housings, damping elements for the electricals industry, automotive industry, mechanical engineering, 3D printing, medicine and consumer goods.

Thermoplastic polyurethanes, referred to hereinbelow as TPU, have long been known. Their technical importance is based on the combination of high-grade mechanical properties with the advantages of cost-effective thermoplastic processing. They may be produced continuously or discontinuously by various known processes, for example the belt process or the extruder process. An overview of TPU, its properties and applications may be found for example in "Kunststoff-Handbuch", volume 7, "Polyurethane", 3rd Edition, 1993, edited by G. Oertel, Carl Hanser Verlag, Munich.

Thermoplastic polyurethanes (TPU) are block copolymers in which hard blocks are joined to soft blocks in a polymer chain. Hard blocks are to be understood as meaning polymer segments whose softening temperature—glass transition temperature or crystallized melting temperature—is high above the usage temperature. Soft blocks are polymer segments having glass transition temperatures far below the usage temperature, preferably less than 0° C. The hard blocks form physical crosslinks which can be reversibly broken during thermoplastic processing and reformed during cooling. The latter product group comprises as a semicrystalline hard phase the reaction product of an organic diisocyanate with a low molecular weight diol and as an amorphous soft phase the reaction product of an organic diisocyanate with a polyester, polycarbonate or polyether diol having molecular weights of typically 500 to 5000 g/mol.

Thermoplastic polyurethanes (TPU) have the advantage compared to crosslinked polyurethanes that they may be repeatedly melted and thus recycled as a polymer. Thermoplastic processing would constitute a simple and cost-effective process for reuse of polyurethane wastes.

Chemical processes such as hydrolysis, hydrogenation, pyrolysis and glycolysis are suitable for the recovery of polyurethanes. The polyurethanes may further be dissolved in isocyanates and the mixture thus obtained supplied to the reuse after purification (DE 43 16 389 A1). These processes have in common that the polyurethanes can only be reintroduced into a production process with considerable investment of raw materials and energy.

The remelted TPU may in principle be directly used to produce new products. However, several problems exist even when recycling single-variety production wastes and/or consumer wastes: each melting operation reduces the molecular weight and the polymer chain length through cleavage; when production wastes of different grades and lots, which may be products having different hard segment contents, are collected a mixture can afford only more or less random products. The reaction of isocyanate groups with moisture leads to increased build-up of urea compounds which have an adverse effect on the melting behavior of the thermoplastics and can lead to crosslinking. The achievable mechanical properties of these products depend on the mixing ratio and, from experience, are always below those of the starting products. Adding a little isocyanate can increase the molecular weight of the polymers again somewhat, but has no effect on final stiffness and cannot reverse phase mixing of soft and hard phases or crosslinking.

It is accordingly an object of the present invention to provide a process which makes it possible to produce a material whose mechanical properties are comparable to those of freshly produced TPU from thermoplastic polyurethanes, in particular from single-variety production wastes or consumer wastes. It is a further object of the present invention to provide a process which makes it possible to cost-effectively produce thermoplastic polyurethanes having good mechanical properties from recycling raw materials. The process further makes it possible to produce TPUs having a desired target hardness from mixtures of thermoplastic polyurethanes of different hardnesses substantially independently of the mixture hardness present.

This object is achieved in accordance with the invention by a process for producing a thermoplastic polyurethane comprising the steps of (a) reacting at least one thermoplastic polyurethane (TPU-1) or a polyurethane mixture comprising a thermoplastic polyurethane (TPU-1) with at least one compound (V1) having two hydroxyl groups to obtain a mixture (G-a) comprising a thermoplastic polyurethane (TPU-2), wherein the average molecular weight of the thermoplastic polyurethane (TPU-2) is lower than the average molecular weight of the thermoplastic polyurethane (TPU-1);

(b) reacting the mixture (G-a) with a mixture (G-b) comprising an isocyanate composition (ZI) comprising at least one diisocyanate and optionally a polyol composition (ZP) comprising at least one polyol (P2) to obtain a thermoplastic polyurethane (TPU-target), wherein the proportion of the employed components (ZI) and (ZP) is matched to the hard segment content of the employed thermoplastic polyurethane (TPU-1), (V1) and the hard segment content of the thermoplastic polyurethane (TPU-target).

It has surprisingly been found that it is possible to specifically initiate the molecular weight degradation of a first thermoplastic polyurethane or a mixture of thermoplastic polyurethanes and in a subsequent synthesis step produce a TPU that is adjustable in defined fashion. To this end, the hard segment content/the stiffness or the shore hardness of an ideally homogeneous mixture of the product to be recycled is initially determined. These data and the target values for the hard segment content make it possible to calculate the required formulation constituents, in particular of polyol, diol and isocyanate.

In the two-stage process according to the invention the employed thermoplastic polyurethane or the mixture of thermoplastic polyurethanes, for example a recycling product, is initially specifically cleaved at the urethane bonds using diols in a reaction extruder for example and in a subsequent step resynthesized to afford a linear thermoplastic polyurethane using isocyanates and optionally further diols and polydiols. Through choice of the employed building blocks it is possible to specifically grow soft phase, for example through use of polyol and/or aliphatic isocyanate, hard phase, for example through use of diol and/or aromatic isocyanate, or a phase-separated TPU, for example through use of diol, polyol and aromatic isocyanate.

It has surprisingly been found that the thermoplastic polyurethane obtainable according to the invention has comparable properties to a thermoplastic polyurethane produced directly from the synthesis components.

The process of the invention comprises the steps (a) and (b). Initially in step (a) at least one thermoplastic polyurethane (TPU-1) or a polyurethane mixture comprising a thermoplastic polyurethane (TPU-1) is reacted with at least one compound (V1) having two hydroxyl groups to obtain a mixture (G-a) comprising a thermoplastic polyurethane (TPU-2), wherein the average molecular weight of the thermoplastic polyurethane (TPU-2) is lower than the average molecular weight of the thermoplastic polyurethane (TPU-1).

According to the invention the thermoplastic polyurethane (TPU-1) reacts with the compound (V1) to cleave the urethane bonds of the thermoplastic polyurethane. The employed compound (V1) has two hydroxyl groups. According to the invention the compound (V1) may especially be a diol having a molecular weight of <500 g/mol or a polyol having a molecular weight of ≥500 g/mol. According to the invention it is also possible to employ two or more compounds (V1).

Accordingly in a further embodiment the present invention relates to a process as described hereinabove, wherein the compound (V1) is selected from diols (D1) having a number-average molecular weight <500 g/mol or polyols (P1) having a number-average molecular weight ≥500 g/mol. For this embodiment the relation (V1)=(D1)+(P1) accordingly applies.

In step (b) the mixture (G-a) obtained in step (a) is reacted with a mixture (G-b) comprising an isocyanate composition (ZI) comprising at least one diisocyanate and optionally a polyol composition (ZP) comprising at least one polyol (P2) to obtain a thermoplastic polyurethane (TPU-target). According to the invention the individual components are employed in amounts such that the proportion of the employed components (ZI) and (ZP) is matched to the hard segment content of the employed thermoplastic polyurethane (TPU-1), (V1) and the hard segment content of the thermoplastic polyurethane (TPU-target).

According to the invention the amount of the employed isocyanate composition and of the compound (V1) and of the polyol composition is matched such that by accounting for the previously determined hard segment content of the employed thermoplastic polyurethane (TPU-1) and of the polyurethane mixture comprising a thermoplastic polyurethane (TPU-1) the desired hard segment content of the thermoplastic polyurethane (TPU-target) produced by the process according to the invention is obtained.

In the context of the present invention the hard segment content of the thermoplastic polyurethane may be determined in any way known to those skilled in the art. According to the invention the hard segment content is in particular determined via the content of the diol in the total weight of the respective thermoplastic polyurethane.

In a further embodiment the present invention accordingly relates to a process as described hereinabove, wherein the hard segment content is determined via the content of the diol in the total weight of the respective thermoplastic polyurethane.

It has surprisingly been found that the hard segment content of the thermoplastic polyurethane produced can be advantageously calculated. In the context of the present invention the hard segment content (HSC, in % by weight) of the mixture to be added (G-b) to achieve the target HSC (% by weight) of (TPU-target) may be determined according to formula (1):

$$HSC_{G-c} = (HSC_{TPU\text{-}target} - w_{TPU\text{-}1} * HSC_{TPU\text{-}1})/(1 - w_{TPU\text{-}1}) \quad (1)$$

The following assumptions and relations feed into the calculation:

The recycling quota, $w_{TPU\text{-}1}$, may be selected between 0 and 1.

For the following calculations the relation
G-c=G-b+V1 applies.

When a diol (D1) and/or a polyol (P1) are employed as compound (V1)
G-c=G-b+V1=G-b+D1+P1 preferably applies.

$$\text{For the mass fraction } (w_i): w_i = m_i/m_{total} \quad (2)$$

In the context of the present invention the formulation of the mixture (G-c) to be added based on the desired HSC is calculated according to formula (5) which follows from formulae (3) and (4) by substitution of (4) into (3):

$$HSC_{G-c} = (n_{D1} * M_{ZI} + m_{D1}) * 100/m_{G-c} \quad (3)$$

$$\text{where } n_i = m_i/M_i \quad (4)$$

The amount of KV present in 100 g of the mixture (G-c) to be added may be calculated according to formula (5):

$$m_{D1} = (HSC_{G-c} * m_{G-c})/((M_{ZI}/M_{D1}+1)*100) \quad (5)$$

Accounting for mass balance:

$$m_{total} = m_{TPU\text{-}1} + m_{G-c} \quad (6)$$

The index of the target TPU may be calculated according to formula (7):

$$KZR_{TPU\text{-}target} = 1000 * n_{ZI}/(n_{D1}+n_{P1}+n_{P2}+n_{TPU\text{-}1}) \quad (7)$$

This is based on the assumption that the employed thermoplastic polyurethane (TPU-1) is OH-terminated. In the context of the present invention the mass fraction of the recycling (TPU-1), w(TPU-1), is freely choosable between 0 and 1.

The hard segment content of the sum of the added components (G-c) may be between 0% and 100%, wherein at a value of 0 no diol (D1) having an Mw <500 g/mol, but rather a longer chain polyol P1, is added for degradation of the TPU-1. Degradation typically requires at least 5-10 parts per 100 parts of the TPU-1 to be degraded.

The hard segment content of the thermoplastic polyurethane (TPU-1), $HSC_{TPU\text{-}1}$, is either known or may be determined from the hardness of the TPU by known processes, for example by IR spectroscopy. When a mixture of different thermoplastic polyurethanes is employed the average hard segment content is used as a basis.

In a further embodiment the present invention accordingly relates to a process as described hereinabove, wherein the proportion of the employed components (ZI), (ZP) and (D1), (P1) is matched to the hard segment content of the employed thermoplastic polyurethane (TPU-1) via formula (1):

$$HSC_{G-c}=(HSC_{TPU\text{-}target}-w_{TPU\text{-}1}*HSC_{TPU\text{-}1})/(1-w_{TPU\text{-}1}) \quad (1),$$

where $HSC_{G-c}$=hard segment content of a mixture G-c, wherein G-c=G-b+V1=G-b+D1+P1

$HSC_{TPU\text{-}target}$=hard segment content of the obtained thermoplastic polyurethane TPU-target $w_{TPU\text{-}1}$=mass fraction of the thermoplastic polyurethane TPU-1 where $$(w_i): w_i=m_i/m_{total} \quad (2)$$

$HSC_{TPU\text{-}1}$=hard segment content of the thermoplastic polyurethane TPU-1.

The ratio of the molecular weight of the employed thermoplastic polyurethane (TPU-1) to the molecular weight of the thermoplastic polyurethane (TPU-2) obtained in the mixture (G-a) in step (a) may be varied over wide ranges. The ratio of the hard segment content of the employed thermoplastic polyurethane (TPU-1) to the hard segment content of the thermoplastic polyurethane (TPU-2) obtained in the mixture (G-a) in step (a) may also be varied over wide ranges in the context of the present invention.

It has proven to be advantageous when the thermoplastic polyurethane (TPU-2) has an average molecular weight Mw of less than 50% of the average molecular weight of (TPU-1). In a further embodiment the present invention accordingly relates to a process as described hereinabove, wherein the thermoplastic polyurethane (TPU-2) has an average molecular weight Mw of less than 50% of the average molecular weight of (TPU-1).

The thermoplastic polyurethane (TPU-2) preferably has an average molecular weight Mw in the range from 5000 to 15 000 g/mol.

Unless otherwise stated, the weight-average molecular weights Mw of the thermoplastic block copolymers are determined within the context of the present invention by means of GPC, dissolved in HFIP (hexafluoroisopropanol). The molecular weight is determined using two GPC columns arranged in series (PSS-Gel; 100 A; 5μ; 300*8 mm, Jordi-Gel DVB; mixed bed; 5μ; 250*10 mm; column temperature 60° C.; flow 1 ml/min; RI detector). Calibration is performed here with polymethyl methacrylate (EasyCal; from PSS, Mainz) and HFIP is used as eluent.

In the context of the present invention the process is for example run such that the thermoplastic polyurethane (TPU-2) has an average molecular weight Mw of less than 50 000 g/mol, preferably of less than 30 000 g/mol, more preferably of less than 15 000 g/mol. In the context of the present invention the thermoplastic polyurethane (TPU-2) preferably has an average molecular weight Mw of more than 5000 g/mol.

In a further embodiment the present invention accordingly relates to a process as described hereinabove, wherein the thermoplastic polyurethane (TPU-2) is OH-terminated and has an average molecular weight Mw of less than 50 000 g/mol.

In step (a) the reaction is carried out at a temperature of more than 200° C. The reaction in step (a) is carried out under suitable conditions allowing reaction of the employed thermoplastic polyurethane (TPU-1) or of the polyurethane mixture comprising a thermoplastic polyurethane (TPU-1) with the free OH groups of the compound (V1). According to the invention the reaction may be effected in a suitable apparatus, wherein suitable processes are known per se to those skilled in the art.

The reaction in step (a) may be carried out for example at a temperature in the range from 200° C. to 360° C., preferably in the range from 220° C. to 320° C. and in particular from 220° C. to 310° C., more preferably from 230° C. to 280° C., and a residence time of for example 20 to 300 s in for example a flowable, softened or preferably molten state of the thermoplastic polyurethane, in particular by stirring, rolling, kneading or preferably extruding, for example using customary plasticizing apparatuses, for example mills, kneaders or extruders, preferably in an extruder.

In a further embodiment the present invention accordingly relates to a process as described hereinabove, wherein the reaction in step (a) is carried out at a temperature in the range from 200° C. to 360° C.

The reaction in step (b) may be carried out for example at a temperature in the range from 170° C. to 260° C., preferably in the range from 180° C. to 240° C. and in particular from 190° C. to 230° C., more preferably from 200° C. to 220° C., in particular by stirring, rolling, kneading or preferably extruding, for example using customary plasticizing apparatuses, for example, mills, kneaders or extruders, preferably in an extruder.

In a further embodiment the present invention accordingly relates to a process as described hereinabove, wherein the reaction in step (b) is carried out at a temperature in the range from 170° C. to 260° C.

In particular the reaction in step (a) or the reaction in step (b) or the reaction in step (a) and step (b) may be carried out in an extruder.

In a further embodiment the present invention accordingly relates to a process as described hereinabove, wherein the reaction in step (a) and the reaction in step (b) are carried out continuously in an extruder.

Suitable apparatuses are known per se to those skilled in the art.

According to the invention it is also possible for additives or auxiliaries to be used for the reaction in step (a) or in step (b) to accelerate/improve the reaction in step (a). In particular, catalysts may be used.

In a further embodiment the present invention accordingly relates to a process as described hereinabove, wherein at least one catalyst which accelerates the cleavage of (TPU-1) is added to the reaction in step (a).

Suitable catalysts are likewise known in principle from the prior art. Suitable catalysts are for example organic metal compounds selected from the group consisting of tin, titanium, zirconium, hafnium, bismuth, zinc, aluminum and iron organyls, for example tin organyl compounds, preferably tin dialkyls such as dimethyltin or diethyltin, or tin organyl compounds and tin salts of aliphatic carboxylic acids, preferably tin(II) isooctoate, tin dioctoate, tin diacetate, tin dilaurate, dibutyltin diacetate, dibutyltin dilaurate, and titanate esters, bismuth compounds, such as bismuth alkyl compounds, preferably bismuth neodecanoate or similar, or iron compounds, preferably iron(III) acetylacetonate.

The catalysts are typically employed in amounts of 3 ppm to 2000 ppm, preferably 10 ppm to 1,000 ppm, more preferably 20 ppm to 500 ppm and most preferably 30 ppm to 300 ppm.

In a further embodiment the present invention accordingly relates to a process as described hereinabove, wherein the catalyst is selected from the group consisting of metal catalysts based on tin, zinc, titanium, bismuth or iron. Suitable catalysts for the reaction according to step (a) are for example tributyltin oxide, tin(II) dioctoate, dibutyltin dilaurate or Bi(III) carboxylates.

In step (a) the thermoplastic polyurethane (TPU-1) is reacted with a compound (V1) having two hydroxyl groups. The compound (V1) is preferably a diol (D1) having a number-average molecular weight <500 g/mol or a polyol (P1) having a number-average molecular weight ≥500 g/mol.

Suitable diols are known per se to those skilled in the art. It is preferable to employ aliphatic, araliphatic, aromatic and/or cycloaliphatic diols having a molecular weight of 50 g/mol to 220 g/mol. Preference is given to alkanediols having 2 to 10 carbon atoms in the alkylene radical, especially di-, tri-, tetra-, penta-, hexa-, hepta-, octa-, nona- and/or decaalkylene glycols. Particularly preferred for the present invention are 1,2-ethylene glycol, propane-1,3-diol, butane-1,4-diol, hexane-1,6-diol. It is also possible to employ aromatic compounds such as hydroxyquinone bis (2-hydroxyethyl) ether.

It is preferable to employ a diol having a molecular weight Mw <220 g/mol.

In a further embodiment two or more diols are employed, for example mixtures of the recited diols.

In a further embodiment the present invention accordingly relates to a process as described hereinabove, wherein the diol (D1) is selected from the group consisting of 1,2-ethylene glycol, propane-1,3-diol, butane-1,4-diol and hexane-1,6-diol.

Suitable polyols (P1) having a number-average molecular weight ≥500 g/mol are also known per se to the person skilled in the art. Suitable polyols (P1) typically have a number-average molecular weight of less than 5000 g/mol, preferably less than 3000 g/mol.

Polyols are known in principle to those skilled in the art and described for example in "Kunststoffhandbuch", volume 7, "Polyurethane", Carl Hanser Verlag, 3rd edition 1993, Chapter 3.1; particularly preferably employed polyols are polyesterols or polyetherols. Polyether polyols are particularly preferred. The number-average molecular weight of the polyols employed according to the invention are by preference between 500 g/mol and 3000 g/mol, preferably between 600 g/mol and 2500 g/mol, especially between 650 g/mol and 2000 g/mol.

According to the invention preferred polyetherols are polyethylene glycols, polypropylene glycols and polytetrahydrofurans.

In a particularly preferred embodiment the polymer diol is a polytetrahydrofuran (PTHF) having a molecular weight in the Mn range of 500 g/mol to 3000 g/mol.

According to the invention not only PTHF but also other further polyether diols or else polyester diols are suitable.

In a further embodiment the present invention accordingly relates to a process for producing a diblock copolymer as described hereinabove, wherein the polymer diol is a polyether diol. In another embodiment the present invention also relates to a process for producing a diblock copolymer as described hereinabove, wherein the polymer diol is a polytetrahydrofuran.

Polyether diols for example are suitable, for example PTHF 250 or PTHF 650 or a short-chain polypropylene glycol such as a PPG 500 may be employed. According to the invention the production of the polyols (P1) may also employ further polyester diols as input materials, for example butanediol adipate or ethylene adipate.

Employable polyesterols include polyesterols based on diacids and diols. Employed diols are preferably diols having 2 to 10 carbon atoms, for example ethanediol, propanediol, butanediol, pentanediol, hexanediol or di- or triethylene glycol, especially butane-1,4-diol or mixtures thereof.

Employable diacids include all known diacids, for example linear or branched-chain diacids having four to 12 carbon atoms or mixtures thereof. It is preferable when the diacid employed is adipic acid According to the invention not only PTHF but also a very wide variety of other polyethers are suitable, while polyesters, block copolymers and hybrid polyols, for example poly(ester/amide), may likewise be used.

Suitable polyols are thus for example selected from the group consisting of polyetherols, polyesterols, polycarbonate alcohols and hybrid polyols.

According to the invention the polyol may be used in pure form or in the form of a composition comprising the polyol and at least one solvent. Suitable solvents are known per se to those skilled in the art.

According to the invention the polyol may be used in pure form or in the form of a composition comprising the polyol and at least one solvent. Suitable solvents are known per se to those skilled in the art.

According to the invention mixtures of two or more polyols may also be employed.

In the context of the present invention it is preferable when the polyol (P1) and the polyol (P2) are selected from the group consisting of polyetherols, polyesterols, polycarbonate alcohols and hybrid polyols.

In a further embodiment the present invention accordingly relates to a process as described hereinabove, wherein the polyol (P1) is selected from the group consisting of polyetherols, polyesterols, polycarbonate alcohols and hybrid polyols.

In a further embodiment the present invention accordingly relates to a process as described hereinabove, wherein the polyol (P2) is selected from the group consisting of polyetherols, polyesterols, polycarbonate alcohols and hybrid polyols.

According to the invention step (b) employs an isocyanate composition (ZI) comprising at least one diisocyanate. Mixtures of two or more diisocyanates may also be employed in accordance with the invention. Preferred diisocyanates are in the context of the present invention in particular aliphatic or aromatic diisocyanates.

In the context of the present invention it is further possible to employ as isocyanate components pre-reacted prepolymers in which a portion of the OH components have been reacted with an isocyanate in a preceding reaction step. These prepolymers are reacted with the remaining OH components in a subsequent step, the actual polymer reaction, in order then to form the thermoplastic polyurethane. The use of prepolymers provides the option of also using OH components comprising secondary alcohol groups.

Aliphatic diisocyanates employed are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and methylene dicyclohexyl 4,4'-, 2,4'- and/or 2,2'-diisocyanate (H12MDI); especially preferred are methylene dicyclohexyl 4,4'-, 2,4'- and/or 2,2'-diisocyanate (H12MDI) and 1-isocyanato-3,3,5-trimethyl-5-isocyanatomethylcyclohexane or mixtures thereof.

In a further embodiment the present invention accordingly relates to a process as described hereinabove, wherein the polyisocyanate is selected from the group consisting of 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethylcyclohexane (IPDI) or mixtures thereof.

Suitable aromatic diisocyanates are especially diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI, p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and/or phenylene diisocyanate.

Preferred aromatic diisocyanates are diphenylmethane 2,2'-, 2,4'- and/or 4,4'-diisocyanate (MDI) and mixtures thereof.

According to the invention the diisocyanate is preferably selected from the group consisting of 2,2'-, 2,4'- and/or 4,4'-diphenylmethane diisocyanate (MDI), 2,4- and/or 2,6-tolylene diisocyanate (TDI), 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethylcyclohexane (IPDI).

In a further embodiment the present invention accordingly relates to a process for producing a diblock copolymer as described hereinabove, wherein the diisocyanate is selected from the group consisting of 2,2'-, 2,4'- and/or 4,4'-diphenylmethane diisocyanate (MDI), 2,4- and/or 2,6-tolylene diisocyanate (TDI), 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethylcyclohexane (IPDI).

According to the invention the diisocyanate may be employed in pure form or in the form of a composition comprising the diisocyanate and at least one solvent. Suitable solvents are known to those skilled in the art. Suitable examples are nonreactive solvents such as ethyl acetate, methyl ethyl ketone, tetrahydrofuran and hydrocarbons.

According to the invention further input materials, for example catalysts or auxiliaries and additives, may be added during the reaction according to step (b).

Suitable auxiliaries and additives are known per se to those skilled in the art. Examples include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additives may be found for example in Kunststoffhandbuch, volume VII, edited by Vieweg and Höchtlen, Carl Hanser Verlag, Munich 1966 (p. 103-113).

Suitable catalysts are likewise known in principle from the prior art. Suitable catalysts are for example organic metal compounds selected from the group consisting of tin, titanium, zirconium, hafnium, bismuth, zinc, aluminum and iron organyls, for example tin organyl compounds, preferably tin dialkyls such as dimethyltin or diethyltin, or tin organyl compounds and tin salts of aliphatic carboxylic acids, preferably tin(II) isooctoate, tin dioctoate, tin diacetate, tin dilaurate, dibutyltin diacetate, dibutyltin dilaurate, and titanate esters, bismuth compounds, such as bismuth alkyl compounds and carboxylates, preferably bismuth neodecanoate or similar, or iron compounds, preferably iron(III) acetylacetonate.

In a preferred embodiment the catalysts are selected from tin compounds and bismuth compounds, more preferably tin carboxylates or bismuth carboxylates. Tin(II) isooctoate and bismuth neodecanoate are particularly suitable.

The catalysts are typically employed in amounts of 3 ppm to 2000 ppm, preferably 10 ppm to 1200 ppm, more preferably 20 ppm to 1000 ppm and most preferably 30 ppm to 800 ppm.

In a further embodiment the present invention accordingly relates to a process as described hereinabove, wherein the diisocyanate is selected from the group consisting of diphenylmethane 2,2'-, 2,4'- and/or 4,4'-diisocyanate (MDI), tolylene 2,4- and/or 2,6-diisocyanate (TDI), methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI).

According to the invention the thermoplastic polyurethane (TPU-1) employed in the process may derive from for example overproduction or incorrect production or may also be a recycling product. The thermoplastic polyurethane (TPU-1) is employed in the process for example in shredded form, as a pellet material, as an agglomerate or as a powder.

In the context of the present invention the thermoplastic polyurethane (TPU-1) is preferably employed in the process as an agglomerate.

In a further embodiment the present invention accordingly relates to a process as described hereinabove, wherein the employed thermoplastic polyurethane (TPU-1) derives from a recycling process, for example from a recycling process of industrial production wastes or consumer wastes.

The difficulty in the recycling of thermoplastic polyurethanes and in particular the agglomeration is that of controlling the temperature profile in a suitable apparatus in such a way that on the one hand there is sufficient heat to convert the thermoplastic plastic particles into the plasticized state while on the other hand excessively high temperatures which would otherwise lead to thermal material damage by cleavage of the polymer chains are avoided. According to the invention it is preferable to employ a thermoplastic polyurethane in the form of an agglomerate or granulate. In the context of the present invention the process for recycling thermoplastic polyurethanes accordingly comprises an agglomeration step. It is preferable to employ an agglomerate having an average particle diameter of 0.5 to 10 mm.

According to the invention it is preferable to employ a thermoplastic polyurethane from industrial production wastes or consumer wastes obtained in a recycling process. It is preferable when the recycling process employs shaped articles or else residues from a process for producing a thermoplastic polyurethane, for example milling scrap, sprues, cutting scrap. The recycling process preferably comprises workup of a shaped article or a scrap which consists substantially of a thermoplastic polyurethane. It is accordingly possible to recycle such shaped articles virtually completely. In a preferred embodiment the process according to the invention comprises comminuting such a shaped article and subsequently agglomerating the intermediate product to afford granulates, agglomerates or the like which may then be employed in a process.

In a further embodiment the present invention accordingly relates to a process as described hereinabove, wherein the recycling process comprises at least the steps (i) to (iii):

(i) providing a shaped article which consists substantially of at least one thermoplastic polyurethane,
(ii) comminuting the shaped article,
(iii) agglomerating the comminuted shaped article to afford an intermediate product (TPU-ZP).

According to the invention the process may comprise further steps, for example cleaning steps, separation of the thermoplastic polyurethane from foreign materials such as for example metals or other plastics, color sorting, postcomminution of the intermediate product (TPU-ZP), mixing and homogenizing of the intermediate product (TPU-ZP), for example in a mixing silo, or mixing of different intermediate products.

In the context of the present invention the shaped article may comprise the thermoplastic polyurethane in various forms, for example in the form of a foam or a particle foam, a compact material or else a yarn. According to the invention the shaped article may also comprise the thermoplastic polyurethane in mixtures of the recited forms.

Shoes for example may be made substantially of thermoplastic polyurethanes in variously processed forms. In a further embodiment the present invention accordingly relates to a process as described hereinabove, wherein the shaped article is a shoe or a part of a shoe. This may be for example a part of a sole or else a nonwoven fabric when the nonwoven fabric consists predominantly of a thermoplastic polyurethane.

According to the invention the shaped article consisting substantially of thermoplastic polyurethanes may from, for example, cable sheathings, hoses, profiles, drive belts, fibers, nonwoven fabrics, films, moldings, soles, sporting goods, shoes, plugs, housings, damping elements for the electricals industry, automotive industry, mechanical engineering, 3-D printing, medicine and consumer goods.

According to the invention the thermoplastic polyurethane may also be in the form of a foam or a particle foam. In a further embodiment the present invention accordingly relates to a process as described hereinabove, wherein the shaped article comprises an expanded thermoplastic polyurethane, for example a particle foam. According to the invention it is also possible to employ for example particle foams that are generated in a production process of a particle foam.

In a further embodiment the present invention accordingly relates to a process as described hereinabove, wherein the shaped article comprises a pure or welded expanded thermoplastic polyurethane.

In the context of the present invention the shaped article preferably comprises 85% by weight of a thermoplastic polyurethane, more preferably at least 90% by weight, particularly preferably at least 95% by weight, especially preferably at least 98% by weight.

In a further embodiment the present invention accordingly relates to a process as described hereinabove, wherein the shaped article comprises at least 85% by weight of a thermoplastic polyurethane. In a further embodiment the present invention accordingly relates to a process as described hereinabove, wherein the shaped article comprises at least 95% by weight of a thermoplastic polyurethane.

Such shaped articles are comminuted with customary processes, for example shredded, for example in a rotary mill, at room temperature to a particle size of typically less than 20 mm, or milled, for example by known cold grinding methods, for example with liquid nitrogen cooling, in a roller mill or hammer mill.-It is preferable to establish a particle size of less than 20 mm, for example a particle size in the range from 1 mm to 20 mm, preferably in the range from 3 mm to 20 mm. Unless otherwise stated the particle size is determined with a classifying sieve in the context of the present invention.

In a further preferred embodiment the present invention accordingly relates to a process as described hereinabove, wherein in the comminuting of the shaped articles in step (ii) a particle size of less than 20 mm is established.

It has been found that exact and constant observance of the correct material-specific temperature results in improved properties of the obtained products. In the context of the present invention it has been found that it is advantageous to prevent thermal stressing of the thermoplastic polyurethane in the recycling and to establish a temperature in the defined range in the agglomeration.

In a further embodiment the present invention accordingly relates to a process as described hereinabove, wherein in the agglomeration in step (iii) the temperature remains below the actual melting range of the thermoplastic polyurethane.

In a further embodiment the present invention accordingly relates to a process as described hereinabove, wherein in the agglomeration in step (iii) the temperature is below 200° C.

Thermal stressing and cleavage of the polymer chains can especially be reduced through suitable choice of the apparatus for the agglomeration. It has been found that suitable apparatuses are especially those employing apparatuses for agglomeration having an annular compression space, in particular comprising suitable internals.

In a further embodiment the present invention accordingly relates to a process as described hereinabove, wherein for the agglomeration in step (iii) said process employs an apparatus comprising a conveying screw having a feed and an annular compression space, wherein the conveying screw passes the feed material axially into the compression space.

Suitable apparatuses are described for example in DE 102005027861 B4 or EP 0 373 372 B1.

The granulates, agglomerates or the like of recycled thermoplastic polyurethanes typically have a particle size of 0.1 to 50 mm, preferably 0.5 to 25 mm, in particular 2 to 10 mm. For the addition of granulates, agglomerates or the like of recycled thermoplastic polyurethanes into the reaction mixture before reaction of the reaction mixture the preferred particle size is 0.5 to 10 mm.

The thermoplastic polyurethanes obtained or obtainable by the process according to the invention have good mechanical properties and may be employed in customary processes for processing thermoplastic polyurethanes. Thermoplastic polyurethanes obtained or obtainable according to the invention are particularly advantageously employable in injection molding processes to produce shaped articles.

In a further aspect the present invention also relates to a thermoplastic polyurethane obtained or obtainable by a process as described hereinabove. The present invention accordingly relates to a thermoplastic polyurethane obtained or obtainable by a process for producing a thermoplastic polyurethane comprising the steps of (a) reacting at least one thermoplastic polyurethane (TPU-1) or a polyurethane mixture comprising a thermoplastic polyurethane (TPU-1) with a compound (V1) having two hydroxyl groups to obtain a mixture (G-a) comprising a thermoplastic polyurethane (TPU-2), wherein the average molecular weight of the thermoplastic polyurethane (TPU-2) is lower than the average molecular weight of the thermoplastic polyurethane (TPU-1);

(b) reacting the mixture (G-a) with a mixture (G-b) comprising an isocyanate composition (ZI) comprising at least one diisocyanate and optionally a polyol composition (ZP) comprising at least one polyol (P2) to obtain a thermoplastic polyurethane (TPU-target), wherein the proportion of the employed components (ZI) and (ZP) is matched to the hard segment content of the employed thermoplastic polyurethane (TPU-1), (V1) and the hard segment content of the thermoplastic polyurethane (TPU-target).

The processing of the obtained thermoplastic polyurethanes may be carried out according to customary processes, for example in extruders, injection molding machines, calenders, kneaders and presses, preferably by injection molding.

Good mechanical properties and good thermal behavior make the thermoplastic polyurethanes according to the invention suitable in particular for producing extruded, injection molded and pressed articles and also foams, cable sheathings, hoses, profiles, drive belts, fibers, nonwovens, films, moldings, soles, shoes, plugs, housings, damping elements for the electricals industry, automotive industry, mechanical engineering, 3-D printing, medicine and consumer goods.

In a further aspect the present invention also relates to the use of a thermoplastic polyurethane as described hereinabove or of a thermoplastic polyurethane obtained or obtainable by a process as described hereinabove for producing extruded, injection molded and pressed articles and also foams, cable sheathings, hoses, profiles, drive belts, fibers, nonwovens, films, moldings, soles, shoes, plugs, housings, damping elements for the electricals industry, automotive industry, mechanical engineering, 3-D printing, medicine and consumer goods.

Further embodiments of the present invention may be found in the claims and the examples. It will be appreciated that the features of the subject matter/processes/uses according to the invention recited above and elucidated below may be used not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are recited hereinbelow but in no way limit the present invention. The present invention especially also encompasses embodiments resulting from the dependency references and hence combinations specified hereinbelow.

1. Process for producing a thermoplastic polyurethane comprising the steps of
   (a) reacting at least one thermoplastic polyurethane (TPU-1) with a compound (V1) having two hydroxyl groups to obtain a mixture (G-a) comprising a thermoplastic polyurethane (TPU-2), wherein the average molecular weight of the thermoplastic polyurethane (TPU-2) is lower than the average molecular weight of the thermoplastic polyurethane (TPU-1);
   (b) reacting the mixture (G-a) with a mixture (G-b) comprising an isocyanate composition (ZI) comprising at least one diisocyanate and optionally and a polyol composition (ZP) comprising at least one polyol (P2) to obtain a thermoplastic polyurethane (TPU-target), wherein the proportion of the employed components (ZI) and (ZP) is matched to the hard segment content of the employed thermoplastic polyurethane (TPU-1), (V1) and the hard segment content of the thermoplastic polyurethane (TPU-target).

2. Process according to embodiment 1, wherein the compound (V1) is selected from diols (D1) having a number-average molecular weight <500 g/mol or polyols (P1) having a number-average molecular weight ≥500 g/mol.

3. Process according to embodiment 1 or 2, wherein the proportion of the employed components (ZI), (ZP) and (D1), (P1) is matched to the hard segment content of the employed thermoplastic polyurethane (TPU-1) via formula (1):

$$HSC_{G\text{-}c}=(HSC_{TPU\text{-}target}-w_{TPU\text{-}1}*HSC_{TPU\text{-}1})/(1-w_{TPU\text{-}1}) \quad (1),$$

where
$HSC_{G\text{-}c}$=hard segment content of a mixture G-c, wherein G-c=G-b+V1=G-b+D1+P1
$HSC_{TPU\text{-}target}$=hard segment content of the obtained thermoplastic polyurethane TPU-target
$w_{TPU\text{-}1}$=mass fraction of the thermoplastic polyurethane TPU-1 where $$(w_i): w_i=m_i/m_{total} \quad (2)$$

$HSC_{TPU\text{-}1}$=hard segment content of the thermoplastic polyurethane TPU-1.

4. Process for producing a thermoplastic polyurethane comprising the steps of
   (a) reacting at least one thermoplastic polyurethane (TPU-1) with a compound (V1) having two hydroxyl groups to obtain a mixture (G-a) comprising a thermoplastic polyurethane (TPU-2), wherein the average molecular weight of the thermoplastic polyurethane (TPU-2) is lower than the average molecular weight of the thermoplastic polyurethane (TPU-1);
   (b) reacting the mixture (G-a) with a mixture (G-b) comprising an isocyanate composition (ZI) comprising at least one diisocyanate and optionally and a polyol composition (ZP) comprising at least one polyol (P2) to obtain a thermoplastic polyurethane (TPU-target), wherein the proportion of the employed components (ZI) and (ZP) is matched to the hard segment content of the employed thermoplastic polyurethane (TPU-1), (V1) and the hard segment content of the thermoplastic polyurethane (TPU-target),
   wherein the proportion of the employed components (ZI), (ZP) and (D1), (P1) is matched to the hard segment content of the employed thermoplastic polyurethane (TPU-1) via formula (1):

$$HSC_{G\text{-}c}=(HSC_{TPU\text{-}target}-w_{TPU\text{-}1}*HSC_{TPU\text{-}1})/(1-w_{TPU\text{-}1}) \quad (1),$$

where
$HSC_{G\text{-}c}$=hard segment content of a mixture G-c, wherein G-c=G-b+V1=G-b+D1+P1
$HSC_{TPU\text{-}target}$=hard segment content of the obtained thermoplastic polyurethane TPU-target
$w_{TPU\text{-}1}$=mass fraction of the thermoplastic polyurethane TPU-1 where $$(w_i): w_i=m_i/m_{total} \quad (2)$$

$HSC_{TPU\text{-}1}$=hard segment content of the thermoplastic polyurethane TPU-1.

5. Process according to any of embodiments 1 to 4, wherein the thermoplastic polyurethane (TPU-2) has an average molecular weight Mw of less than 50% of the average molecular weight of (TPU-1).

6. Process according to any of embodiments 1 to 5, wherein the thermoplastic polyurethane (TPU-2) is OH-terminated and has an average molecular weight Mw of less than 50 000.

7. Process according to any of embodiments 1 to 6, wherein the reaction in step (a) is carried out at a temperature in the range from 200° C. to 360° C.

8. Process according to any of embodiments 1 to 7, wherein the reaction in step (b) is carried out at a temperature in the range from 170° C. to 260° C.

9. Process according to any of embodiments 1 to 8, wherein the reaction in step (a) and the reaction in step (b) are carried out continuously in an extruder.

10. Process according to any of embodiments 1 to 9, wherein at least one catalyst which accelerates the cleavage of (TPU-1) is added to the reaction in step (a).

11. Process according to embodiment 10, wherein the catalyst is selected from the group consisting of metal catalysts based on tin, zinc, titanium, bismuth or iron.

12. Process according to any of embodiments 2 to 11, wherein the diol (D1) is selected from the group consisting of 1,2-ethylene glycol, propane-1,3-diol, butane-1,4-diol and hexane-1,6-diol.

13. Process according to any of embodiments 2 to 11, wherein the polyol (P1) or the polyol (P2) or the polyol (P1) and the polyol (P2) are selected from the group consisting of polyetherols, polyesterols, polycarbonate alcohols and hybrid polyols.

14. Process according to any of embodiments 1 to 13, wherein the diisocyanate is selected from the group consisting of diphenylmethane 2,2'-, 2,4'- and/or 4,4'-diisocyanate (MDI), tolylene 2,4- and/or 2,6-diisocyanate (TDI), methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI).

15. Process according to any of embodiments 1 to 14, wherein the employed thermoplastic polyurethane (TPU-1) derives from a recycling process.

16. Thermoplastic polyurethane obtained or obtainable by a process according to any of embodiments 1 to 15.

17. Thermoplastic polyurethane obtained or obtainable by a process comprising the steps of
   (a) reacting at least one thermoplastic polyurethane (TPU-1) with a compound (V1) having two hydroxyl groups to obtain a mixture (G-a) comprising a thermoplastic polyurethane (TPU-2), wherein the average molecular weight of the thermoplastic polyurethane (TPU-2) is lower than the average molecular weight of the thermoplastic polyurethane (TPU-1);
   (b) reacting the mixture (G-a) with a mixture (G-b) comprising an isocyanate composition (ZI) comprising at least one diisocyanate and optionally and a polyol composition (ZP) comprising at least one polyol (P2) to obtain a thermoplastic polyurethane (TPU-target),
   wherein the proportion of the employed components (ZI) and (ZP) is matched to the hard segment content of the employed thermoplastic polyurethane (TPU-1), (V1) and the hard segment content of the thermoplastic polyurethane (TPU-target).

18. Thermoplastic polyurethane according to embodiment 16 or 17, wherein the compound (V1) is selected from diols (D1) having a number-average molecular weight <500 g/mol or polyols (P1) having a number-average molecular weight ≥500 g/mol.

19. Thermoplastic polyurethane according to any of embodiments 16 to 18, wherein the proportion of the employed components (ZI), (ZP) and (D1), (P1) is matched to the hard segment content of the employed thermoplastic polyurethane (TPU-1) via formula (1):

$$HSC_{G\text{-}c}=(HSC_{TPU\text{-}target}-w_{TPU\text{-}1}*HSC_{TPU\text{-}1})/(1-w_{TPU\text{-}1}) \quad (1),$$

where
$HSC_{G\text{-}c}$=hard segment content of a mixture G-c, wherein G-c=G-b+V1=G-b+D1+P1
$HSC_{TPU\text{-}target}$=hard segment content of the obtained thermoplastic polyurethane TPU-target
$w_{TPU\text{-}1}$=mass fraction of the thermoplastic polyurethane TPU-1 where $$(w_i): w_i=m_i/m_{total} \quad (2)$$

$HSC_{TPU\text{-}1}$=hard segment content of the thermoplastic polyurethane TPU-1.

20. Thermoplastic polyurethane obtained or obtainable by a process comprising the steps of
   (a) reacting at least one thermoplastic polyurethane (TPU-1) with a compound (V1) having two hydroxyl groups to obtain a mixture (G-a) comprising a thermoplastic polyurethane (TPU-2), wherein the average molecular weight of the thermoplastic polyurethane (TPU-2) is lower than the average molecular weight of the thermoplastic polyurethane (TPU-1);
   (b) reacting the mixture (G-a) with a mixture (G-b) comprising an isocyanate composition (ZI) comprising at least one diisocyanate and optionally and a polyol composition (ZP) comprising at least one polyol (P2) to obtain a thermoplastic polyurethane (TPU-target),
   wherein the proportion of the employed components (ZI) and (ZP) is matched to the hard segment content of the employed thermoplastic polyurethane (TPU-1), (V1) and the hard segment content of the thermoplastic polyurethane (TPU-target),
   wherein the proportion of the employed components (ZI), (ZP) and (D1), (P1) is matched to the hard segment content of the employed thermoplastic polyurethane (TPU-1) via formula (1):

$$HSC_{G\text{-}c}=(HSC_{TPU\text{-}target}-w_{TPU\text{-}1}*HSC_{TPU\text{-}1})/(1-w_{TPU\text{-}1}) \quad (1),$$

where
$HSC_{G\text{-}c}$=hard segment content of a mixture G-c, wherein G-c=G-b+V1=G-b+D1+P1
$HSC_{TPU\text{-}target}$=hard segment content of the obtained thermoplastic polyurethane TPU-target
$w_{TPU\text{-}1}$=mass fraction of the thermoplastic polyurethane TPU-1 where $$(w_i): w_i=m_i/m_{total} \quad (2)$$

$HSC_{TPU\text{-}1}$=hard segment content of the thermoplastic polyurethane TPU-1.

21. Thermoplastic polyurethane according to any of embodiments 16 to 20, wherein the thermoplastic polyurethane (TPU-2) has an average molecular weight Mw of less than 50% of the average molecular weight of (TPU-1).

22. Thermoplastic polyurethane according to any of embodiments 16 to 21, wherein the thermoplastic polyurethane (TPU-2) is OH-terminated and has an average molecular weight Mw of less than 50 000.

23. Thermoplastic polyurethane according to any of embodiments 16 to 22, wherein the reaction in step (a) is carried out at a temperature in the range from 200° C. to 360° C.

24. Thermoplastic polyurethane according to any of embodiments 16 to 23, wherein the reaction in step (b) is carried out at a temperature in the range from 170° C. to 260° C.

25. Thermoplastic polyurethane according to any of embodiments 16 to 24, wherein the reaction in step (a) and the reaction in step (b) are carried out continuously in an extruder.

26. Thermoplastic polyurethane according to any of embodiments 16 to 18, wherein at least one catalyst which accelerates the cleavage of (TPU-1) is added to the reaction in step (a).

27. Thermoplastic polyurethane according to embodiment 26, wherein the catalyst is selected from the group consisting of metal catalysts based on tin, zinc, titanium, bismuth or iron.

28. Thermoplastic polyurethane according to any of embodiments 18 to 27, wherein the diol (D1) is selected from the group consisting of 1,2-ethylene glycol, propane-1,3-diol, butane-1,4-diol and hexane-1,6-diol.

29. Thermoplastic polyurethane according to any of embodiments 18 to 28, wherein the polyol (P1) or the polyol (P2) or the polyol (P1) and the polyol (P2) are selected from the group consisting of polyetherols, polyesterols, polycarbonate alcohols and hybrid polyols.

30. Thermoplastic polyurethane according to any of embodiments 16 to 29, wherein the diisocyanate is selected from the group consisting of diphenylmethane 2,2'-, 2,4'- and/or 4,4'-diisocyanate (MDI), tolylene 2,4- and/or 2,6-diisocyanate (TDI), methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI).

31. Thermoplastic polyurethane according to any of embodiments 16 to 30, wherein the employed thermoplastic polyurethane (TPU-1) derives from a recycling process.

32. Use of a thermoplastic polyurethane according to any of embodiments 16 to 31 or of a thermoplastic polyurethane obtained or obtainable by a process according to any of embodiments 1 to 15 for producing extruded, injection molded and pressed articles as well as foams, cable sheathings, hoses, profiles, drive belts, fibers, nonwovens, films, moldings, soles, shoes, plugs, housings, damping elements for the electricals industry, automotive industry, mechanical engineering, 3D printing, medicine and consumer goods.

33. Process for producing a thermoplastic polyurethane comprising the steps of
(a) reacting at least one thermoplastic polyurethane (TPU-1) or a polyurethane mixture comprising a thermoplastic polyurethane (TPU-1) with at least one compound (V1) having two hydroxyl groups to obtain a mixture (G-a) comprising a thermoplastic polyurethane (TPU-2), wherein the average molecular weight of the thermoplastic polyurethane (TPU-2) is lower than the average molecular weight of the thermoplastic polyurethane (TPU-1);
(b) reacting the mixture (G-a) with a mixture (G-b) comprising an isocyanate composition (ZI) comprising at least one diisocyanate and optionally and a polyol composition (ZP) comprising at least one polyol (P2) to obtain a thermoplastic polyurethane (TPU-target), wherein the proportion of the employed components (ZI) and (ZP) is matched to the hard segment content of the employed thermoplastic polyurethane (TPU-1), (V1) and the hard segment content of the thermoplastic polyurethane (TPU-target).

34. Process according to embodiment 33, wherein the compound (V1) is selected from diols (D1) having a number-average molecular weight <500 g/mol or polyols (P1) having a number-average molecular weight ≥500 g/mol.

35. Process according to embodiment 33 or 34, wherein the proportion of the employed components
(ZI), (ZP) and (D1), (P1) is matched to the hard segment content of the employed thermoplastic polyurethane (TPU-1) via formula (1):

$$HSC_{G\text{-}c} = (HSC_{TPU\text{-}target} - w_{TPU\text{-}1} * HSC_{TPU\text{-}1})/(1 - w_{TPU\text{-}1}) \quad (1),$$

where
$HSC_{G\text{-}c}$=hard segment content of a mixture G-c, wherein G-c=G-b+V1=G-b+D1+P1
$HSC_{TPU\text{-}target}$=hard segment content of the obtained thermoplastic polyurethane TPU-target
$w_{TPU\text{-}1}$=mass fraction of the thermoplastic polyurethane TPU-1 where $$(w_i): w_i = m_i/m_{total} \quad (2)$$

$HSC_{TPU\text{-}1}$=hard segment content of the thermoplastic polyurethane TPU-1.

36. Process according to any of embodiments 33 to 35, wherein the thermoplastic polyurethane (TPU-2) has an average molecular weight Mw of less than 50% of the average molecular weight of (TPU-1).

37. Process according to any of embodiments 33 to 36, wherein the thermoplastic polyurethane (TPU-2) is OH-terminated and has an average molecular weight Mw of less than 50 000.

38. Process according to any of embodiments 33 to 37, wherein the reaction in step (a) is carried out at a temperature in the range from 200° C. to 360° C.

39. Process according to any of embodiments 33 to 38, wherein the reaction in step (b) is carried out at a temperature in the range from 170° C. to 260° C.

40. Process according to any of embodiments 33 to 39, wherein the reaction in step (a) and the reaction in step (b) are carried out continuously in an extruder.

41. Process according to any of embodiments 33 to 40, wherein at least one catalyst which accelerates the cleavage of (TPU-1) is added to the reaction in step (a).

42. Process according to embodiment 41, wherein the catalyst is selected from the group consisting of metal catalysts based on tin, zinc, titanium, bismuth or iron.

43. Process according to any of embodiments 34 to 42, wherein the diol (D1) is selected from the group consisting of 1,2-ethylene glycol, propane-1,3-diol, butane-1,4-diol and hexane-1,6-diol.

44. Process according to any of embodiments 34 to 43, wherein the polyol (P1) or the polyol (P2) or the polyol (P1) and the polyol (P2) are selected from the group consisting of polyetherols, polyesterols, polycarbonate alcohols and hybrid polyols.

45. Process according to any of embodiments 33 to 44, wherein the diisocyanate is selected from the group consisting of diphenylmethane 2,2'-, 2,4'- and/or 4,4'-diisocyanate (MDI), tolylene 2,4- and/or 2,6-diisocyanate (TDI), methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI).

46. Process according to any of embodiments 33 to 45, wherein the employed thermoplastic polyurethane (TPU-1) or the polyurethane mixture comprising a thermoplastic polyurethane (TPU-1) derives from a recycling process.

47. Process according to embodiment 46, wherein the recycling process comprises at least the steps (i) to (iii):
(i) providing a shaped article which consists substantially of at least one thermoplastic polyurethane,
(ii) comminuting the shaped article,
(iii) agglomerating the comminuted shaped article to afford an intermediate product (TPU-ZP).

48. Process according to embodiment 47, wherein the shaped article is a shoe or a part of a shoe.

49. Process according to embodiment 47 or 48, wherein the shaped article comprises a pure or welded expanded thermoplastic polyurethane.

50. Process according to any of embodiments 47 to 49, wherein the shaped article comprises at least 85% by weight of a thermoplastic polyurethane.

51. Process according to any of embodiments 47 to 50, wherein the shaped article comprises at least 95% by weight of a thermoplastic polyurethane.

52. Process according to any of embodiments 47 to 51, wherein in the agglomeration in step (iii) the temperature is below 200° C.

53. Process according to any of embodiments 47 to 52, wherein for the agglomeration in step (iii) said process employs an apparatus comprising a conveying screw having a feed and an annular compression space, wherein the conveying screw passes the feed material axially into the compression space.

54. Thermoplastic polyurethane obtained or obtainable by a process according to any of embodiments 33 to 53.

55. Use of a thermoplastic polyurethane according to embodiment 54 or of a thermoplastic polyurethane obtained or obtainable by a process according to any of embodiments 1 to 21 for producing extruded, injection molded and pressed articles as well as foams, cable sheathings, hoses, profiles, drive belts, fibers, nonwovens, films, moldings, soles, sporting goods, shoes, plugs, housings, damping elements for the electricals industry, automotive industry, mechanical engineering, 3D printing, medicine and consumer goods.

The examples that follow serve to illustrate the invention, but are in no way limiting with respect to the subject matter of the present invention.

EXAMPLES

1. Inputs/Materials
Polyol 1 polytetrahydrofuran having an Mw of 1000 g/mol
Polyol 2 polytetrahydrofuran having an Mw of 2000 g/mol
Polyol 3 polyesterdiol based on adipic acid and butane-1,4-diol, a functionality of 2 and an Mw of 2400 g/mol
Isocyanate 1 4,4'-MDI
Diol 1 butane-1,4-diol
Antioxidant 1 phenolic antioxidant
Hydrolysis stabilizer 1 polymeric hydrolysis stabilizer based on carbodiimides
TPU 1 thermoplastic polyurethane based on polyol 1 (61.95% by mass), isocyanate 1 (30.98% by mass), diol 1 (5.57% by mass) and antioxidant 1 (1.00% by mass)
TPU 2 thermoplastic polyurethane based on polyol 1 (61.95% by mass), isocyanate 1 (30.98% by mass), diol 1 (5.57% by mass) and antioxidant 1 (1.00% by mass)
TPU 3 thermoplastic polyurethane based on polyol 3 (56.00% by mass), isocyanate 1 (33.60% by mass), diol 1 (9.95% by mass) and hydrolysis stabilizer 1 (0.45% by mass)
TPU 4 thermoplastic polyurethane based on polyol 1 (29.20% by mass), polyol 2 (29.20% by mass), isocyanate 1 (21.70% by mass), diol 1 (3.88% by mass), antioxidant 1 (1.00% by mass) and plasticizers (15% by mass).
TPU 5 thermoplastic polyurethane based on polyol 1 (48.56% by mass), isocyanate 1 (40.30% by mass), diol 1 (10.14% by mass) and antioxidant 1 (1.00% by mass)
TPU 6 thermoplastic polyurethane based on polyol 1 (41.33% by mass), isocyanate 1 (45.47% by mass), diol 1 (12.65% by mass) and antioxidant 1 (0.55% by mass)
TPU 7 thermoplastic polyurethane based on polyol 1 (37.34% by mass), isocyanate 1 (48.28% by mass), diol 1 (14.04% by mass) and antioxidant 1 (0.50% by mass)
TPU-ZP 1 agglomerated intermediate product based on shaped articles made of TPU 1 (100% by mass)
TPU-ZP 2 agglomerated intermediate product based on a mixture of shaped articles made of TPU 1 (67% by mass) and TPU 4 (33% by mass)
TPU-ZP 3 agglomerated intermediate product based on a mixture of shaped articles made of TPU 1 (60% by mass), TPU 4 (30% by mass) and TPU 7 (10% by mass)
TPU-ZP 4 agglomerated intermediate product based on a mixture of molded articles which consist of TPU 1 (42.5% by mass), TPU 4 (20.5% by mass), TPU 5 (8.33% by mass), TPU 6 (2.1% by mass) and TPU 7 (26.6% by mass)
x-Flex Isocyanate concentrate based on an MDI prepolymer in a polyester-based thermoplastic polyurethane having an NCO content of 10% by weight 2. General Description of the Experiment 2.1 Production of the Agglomerated Intermediate Product (TPU-ZP)

Provided shaped articles made of thermoplastic polyurethane were milled in a Pallmann PS 3½ cutting mill and aspirated into a Pallmann PFV 250 Plast-Agglomerator. At processing temperatures of 130-180° C. the thermoplastic polyurethane to be recycled was agglomerated over just a few seconds and homogeneously processed into a pourable granulate.

In the comparative examples the agglomeration step described hereinabove was replaced by an extrusion step in a 40 mm twin-screw extruder with underwater pelletization at the customary melt temperatures for the employed TPU.

2.2 Examples for Continuous Synthesis

The recycling-TPU is supplied into the first barrel of a Coperion ZSK58 twin-screw extruder with a screw length of 48D. After melting, the chain extender and optionally a catalyst are added in barrel 3. The transurethanization is carried out at barrel temperatures of 250-300° C. before the amounts of the polyol and diisocyanate required for molar mass growth are added to the reaction mixture in barrel 5. The molar mass growth is performed downstream at barrel temperatures of 180-230° C. Following the synthesis and the obtained melt is subjected to underwater or strand pelletization and dried at 80° C.

2.3 Modification for Examples with x-Flex Addition:

Processing was performed analogously to example 2.3. The addition of the x-Flex was carried out in zone screw 1 together with the TPU.

2.4 Extrusion Test

The granulate was subsequently further processed into test specimens by injection molding or into hoses by extrusion. The hoses were extruded to afford hoses having a diameter of 6 mm by extrusion on a 19 mm single-screw extruder (Brabender) having an L/D ratio of 25 and a 3-zone screw. The zone temperatures were between 160° C. and 200° C. Adjustment of hose geometry was effected by varying the takeoff speed. A visual assessment of the hoses in respect of surface quality (spotting) and homogeneity was carried out.

3. Examples

The working examples were calculated via the hard segment region according to the formulae.

The following example calculation is carried out by way of example for example V2:

Specifications: Recycling quota=80%, HSC target-TPU: 32.3% (Shore hardness 90A), HSC recycling TPU: 21.0%

$$HSC_{G-c}=(HSC_{TPU\text{-}target}-w_{TPU\text{-}1}*HSC_{TPU\text{-}1})/(1-w_{TPU\text{-}1}) \quad \text{Equation (1)}$$

Example calculation:
$HSC_{G-c}=(32.3\%-0.8*21.0\%)/(1-0.8)$
$HSC_{G-c}=77.5\%$ $$m_{D1}=(HSG\text{-}c*mG\text{-}b)/((MZI/MD1+1)*100), \text{ mass of butanediol based on 100 g of } G\text{-}c: \quad \text{Equation (5)}$$

Example calculation:
$m_{D1}=(77.5\%*100\text{ g})/((250\text{ g/mol}/90\text{ g/mol}+1)*100)$
$m_{D1}=20.5\text{ g}$ Accordingly the 20 parts of the TPU comprise 4.20 g of butanediol The index of the target TPU may be calculated according to (7). The proportions of MDI and polyols must be chosen such that the desired index is achieved.

$$KZR_{TPU\text{-}target}=1000*n_{ZI}/(n_{D1}+n_{P1}+n_{P2}+n_{rTPU\text{-}1})$$

Example Calculation:
$KZR_{TPU\text{-}target}=1000*(12.95\text{ g}/250.2\text{ g/mol})/((4.13\text{ g}/90.1\text{ g/mol})+(3.41\text{ g}/1000\text{ g/mol})+79.5\text{ g}/80\,000\text{ g/mol}))$
$KZR_{TPU\text{-}target}=1030$
P2=1000 g/mol, TPU-1=80 000 g/mol, D1=90.1 g/mol, ZI=250.2 g/mol 3.1 Comparative Example 1 (VB1)
TPU 1 was reused as a recyclate directly in injection molding.

3.2 Comparative Example 2 (VB2)
TPU1 was passed as recyclate through ZSK58 (ZSK58 is a corotating twin-screw extruder from Coperion having an internal diameter of 58 mm).

3.3 Comparative Example 3 (VB3)
TPU 1 was employed as recyclate, MDI was added to the melt (zone 5). The employed amounts are reported in table 1.

3.4 Comparative Example 4 (VB4)
TPU 1 was employed as recyclate. x-Flex was added to the melt (zone 1). The employed amounts are reported in table 1.

3.5 Comparative Example 5 (VB5)
TPU 1 was employed as recyclate. x-Flex was added to the melt (zone 1). The employed amounts are reported in table 1.

3.6 Example 1 (V1)
TPU 1 was employed as recyclate. Diol 1, polyol 1 and isocyanate 1 were added in the reported amounts. The employed amounts are reported in table 1.

3.7 Example 2 (V2)
TPU 1 was employed as recyclate. Diol 1, polyol 1 and isocyanate 1 were added in the reported amounts. The employed amounts are reported in table 1.

3.8 Example 3 (V3)
TPU 1 was employed as recyclate. Diol 1, polyol 1 and isocyanate 1 were added in the reported amounts. The employed amounts are reported in table 1.

3.9 Example 4 (V4)
TPU 1 was employed as recyclate. Diol 1, polyol 1 and isocyanate 1 were added in the reported amounts. The employed amounts are reported in table 1.

3.10 Example 5 (V5)
TPU 2 was employed as recyclate. Diol 1, polyol 1 and isocyanate 1 were added in the reported amounts. The employed amounts are reported in table 1.

3.11 Example 6 (V6)
TPU 3 was employed as recyclate. Diol 1, polyol 1 and isocyanate 1 were added in the reported amounts. The employed amounts are reported in table 1.

3.12 Example 7 (V7)
TPU-ZP 1 was used as agglomerated recyclate. Diol 1, polyol 1 and isocyanate 1 were added in the reported amounts. The employed amounts are reported in table 1.

3.13 Example 8 (V8)
TPU-ZP 2 was used as agglomerated recyclate. Diol 1, polyol 1 and isocyanate 1 were added in the reported amounts. The employed amounts are reported in table 1.

3.14 Example 9 (V9)
TPU-ZP 2 was used as agglomerated recyclate. Diol 1, polyol 1 and isocyanate 1 were added in the reported amounts. The employed amounts are reported in table 1.

3.15 Example 10 (V10)
TPU-ZP 3 was used as agglomerated recyclate. Diol 1, polyol 1 and isocyanate 1 were added in the reported amounts. The employed amounts are reported in table 1.

3.16 Example 11 (V11)
TPU-ZP 4 was used as agglomerated recyclate. Diol 1, polyol 1 and isocyanate 1 were added in the reported amounts. The employed amounts are reported in table 1.

3.17 Example 12 (V12)
TPU-ZP 4 was used as agglomerated recyclate. Diol 1, polyol 1 and isocyanate 1 were added in the reported amounts. The employed amounts are reported in table 1a and b.

TABLE 1a

| Input materials/ proportions | VB 1 | VB 2 | VB3 | VB4 | VB5 | V1 | V2 | V3 | V4 | V5 |
|---|---|---|---|---|---|---|---|---|---|---|
| TPU 1 | 100 | 100 | 97.8 | 98.5 | 97.75 | 79.50 | 79.51 | 69.49 | 79.50 | |
| TPU 2 | | | | | | | | | | 64.88 |
| TPU 3 | | | | | | | | | | |
| TPU-ZP1 | | | | | | | | | | |
| TPU-ZP2 | | | | | | | | | | |
| TPU-ZP3 | | | | | | | | | | |
| TPU-ZP4 | | | | | | | | | | |
| x-Flex | | | | 1.5 | 2.25 | | | | | |

TABLE 1a-continued

| Input materials/ proportions | VB 1 | VB 2 | VB3 | VB4 | VB5 | V1 | V2 | V3 | V4 | V5 |
|---|---|---|---|---|---|---|---|---|---|---|
| Diol 1 | | | | 1.5 | 2.25 | 1.11 | 4.13 | 0.67 | 1.11 | 1.04 |
| Polyol 1 | | | | | | 12.53 | 3.41 | 21.82 | 12.53 | 24.81 |
| Isocyanate 1 | | 2.2 | | | | 6.86 | 12.95 | 8.03 | 6.86 | 9.27 |

TABLE 1b

| Input materials/ proportions | V6 | V7 (25/18) | V8 (25/20) | V9 (25/16) | V10 (25/22) | V11 (25/14) | V12 (25/15) |
|---|---|---|---|---|---|---|---|
| TPU 1 | | | | | | | |
| TPU 2 | | | | | | | |
| TPU 3 | 69.83 | | | | | | |
| TPU-ZP1 | | 80 | | | | | |
| TPU-ZP2 | | | 70 | 70 | | | |
| TPU-ZP3 | | | | | 80 | | |
| TPU-ZP4 | | | | | | 80 | 50 |
| x-Flex | | | | | | | |
| Diol 1 | 1.02 | 1.12 | 0.17 | 6.67 | 3.65 | 3.79 | 1.58 |
| Polyol 1 | 20.85 | 12.62 | 23.49 | 3.58 | 4.97 | 4.54 | 35.21 |
| Isocyanate 1 | 8.30 | 6.26 | 6.34 | 19.67 | 11.38 | 11.67 | 13.20 |

4. Properties of Obtained Agglomerated Intermediate Products

| | Shore A | Tensile strength | Elongation at break [%] | Tear propagation strength (with cut-in) [kN/m] | Abrasion determination [mm³] |
|---|---|---|---|---|---|
| VB2 | 85 | 19 | 580 | 41 | 130 |
| ZP1 | 76 | 46 | 710 | 55 | 40 |
| ZP2 | 71 | 38 | 780 | 50 | 36 |
| ZP3 | 76 | 40 | 720 | 43 | 38 |
| ZP4 | 88 | 41 | 510 | 69 | 73 |

In contrast to the comparative example the inventive intermediate products show good mechanical properties and less cleavage of the polymer chains.

5. Properties of Obtained Thermoplastic Polyurethanes

The obtained thermoplastic polyurethanes were investigated in respect of their mechanical properties. The results are shown in table 2.

TABLE 2

| | MFR (190° C., 21.6 kg) | Density [g/cm³] | Shore A | Tensile strength | Elongation at break [%] | Tear propagation strength (with cut-in) [kN/m] | Abrasion determination [mm³] |
|---|---|---|---|---|---|---|---|
| VB1 | >250 | 1.104 | 76 | 26 | 830 | 47 | 99 |
| VB2 | >250 | 1.103 | 75 | 20 | 840 | 35 | 134 |
| VB3 | 15 | 1.106 | 78 | 41 | 460 | 22 | 48 |
| VB4 | 46 | 1.104 | 77 | 32 | 770 | 50 | 64 |
| VB5 | 8.5 | 1.103 | 76 | 43 | 680 | 44 | 47 |
| V1 | 77 | 1.102 | 77 | 31 | 850 | 49 | 56 |
| V2 | 5 | 1.129 | 89 | 50 | 460 | 58 | 37 |
| V3 | 65 | 1.096 | 71 | 36 | 770 | 50 | 47 |
| V4 | 158 | 1.103 | 77 | 32 | 820 | 46 | 75 |
| V5 | n.d. | 1.137 | 93 | 42 | 420 | 78 | 43 |
| V6 | n.d. | 1.168 | 87 | 39 | 550 | 65 | 38 |
| V7 | n.d. | 1.117 | 84 | 53 | 510 | 51 | 35 |
| V8 | 47 | 1.085 | 65 | 32 | 880 | 44 | 41 |
| V9 | 13 | 1.14 | 94 | 45 | 600 | 100 | 39 |
| V10 | 4.4 | 1.124 | 89 | 45 | 480 | 69 | 34 |
| V11 | 14 | 1.126 | 86 | 45 | 600 | 82 | 36 |
| V12 | 73 | 1.097 | 75 | 24 | 860 | 47 | 63 |

In contrast to the comparative examples the inventive examples make it possible to specifically adjust Shore hardnesses via the hard segment content and achieve good mechanical properties independently of the input material. The melt viscosities, expressed by the MFR are adjustable through adjustment of the index, the ratio of OH groups to NCO groups.

6. Methods of Measurement

| | |
|---|---|
| MFR (dried 2 h/110° C.) | DIN EN ISO 1134 |
| Density | DIN EN ISO 1183-1A |
| Shore A | DIN ISO 7619-1 |
| Shore D | DIN ISO 7619-1 |
| Tensile strength | DIN 53504-S2 |
| Elongation at break | DIN 53504-S2 |
| Tear propagation strength (with cut-in) | DIN ISO 34-1, B [b] |
| Abrasion determination | DIN ISO 4649 |

CITED LITERATURE

"Kunststoff-Handbuch", volume 7, "Polyurethane", 3rd Edition, 1993, edited by G. Oertel, Carl Hanser Verlag, Munich.
DE 43 16 389 A1

The invention claimed is:

1. A process for producing a thermoplastic polyurethane, the process comprising:
   (a) reacting a thermoplastic polyurethane (TPU-1) or a polyurethane mixture comprising TPU-1 with a compound (V1) having two hydroxyl groups to obtain a mixture (G-a) comprising a thermoplastic polyurethane (TPU-2), wherein an average molecular weight of TPU-2 is less than an average molecular weight of TPU-1; and
   (b) reacting G-a with a mixture (G-b) comprising an isocyanate composition (ZI) comprising a diisocyanate and optionally a polyol composition (ZP) comprising a polyol (P2) to obtain a thermoplastic polyurethane (TPU-target),
   wherein a proportion of ZI and ZP is matched to a hard segment content of TPU-1, V1 and a hard segment content of TPU-target, and
   a proportion of ZI, ZP and V1 is matched to the hard segment content of TPU-1 via formula (1):

$$HSC_{G-c} = (HSC_{TPU-target} - w_{TPU-1} * HSC_{TPU-1})/(1 - w_{TPU-1}) \quad (1),$$

where
$HSC_{G-c}$ = a hard segment content of a mixture (G-c), wherein G-c=G-b+V1,
$HSC_{TPU-target}$ = a hard segment content of the obtained TPU-target,
$w_{TPU-1}$ = a mass fraction of TPU-1, based on a total mass of TPU-1 and G-c, and
$HSC_{TPU-1}$ = the hard segment content of TPU-1.

2. The process of claim 1, wherein V1 is selected from the group consisting of diols (D1) having a number-average molecular weight <500 g/mol and polyols (P1) having a number-average molecular weight ≥500 g/mol, and
   in formula (1), $HSC_{G-c}$=the hard segment content of G-c, wherein G-c=G-b+V1=G-b+D1+P1.

3. The process of claim 1, wherein the average molecular weight of TPU-2 is less than 50% of the average molecular weight of TPU-1.

4. The process of claim 1, wherein TPU-2 is OH-terminated and the average molecular weight of TPU-2 is less than 50,000.

5. The process of claim 1, wherein the reaction in (a) is carried out at a temperature in a range of from 200° C. to 360° C.

6. The process of claim 1, wherein the reaction in (b) is carried out at a temperature in a range of from 170° C. to 260° C.

7. The process of claim 1, wherein the reaction in (a) and the reaction in (b) are carried out continuously in an extruder.

8. The process of claim 1, wherein a catalyst that accelerates cleavage of TPU-1 is added to the reaction in (a).

9. The process of claim 8, wherein the catalyst is selected from the group consisting of metal catalysts based on tin, zinc, titanium, bismuth or iron.

10. The process of claim 2, wherein D1 is selected from the group consisting of 1,2-ethylene glycol, propane-1,3-diol, butane-1,4-diol and hexane-1,6-diol.

11. The process of claim 2, wherein P1 and/or P2 are selected from the group consisting of polyetherols, polyesterols, polycarbonate alcohols and hybrid polyols.

12. The process of claim 1, wherein the diisocyanate is selected from the group consisting of diphenylmethane 2,2'-, 2,4'- and/or 4,4'-diisocyanate (MDI), tolylene 2,4- and/or 2,6-diisocyanate (TDI), methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI).

13. The process of claim 1, wherein TPU-1 or the polyurethane mixture comprising TPU-1 derives from a recycling process.

14. The process of claim 13, wherein the recycling process comprises:
   (i) providing a shaped article that consists substantially of a thermoplastic polyurethane;
   (ii) comminuting the shaped article; and
   (iii) agglomerating the comminuted shaped article to afford an intermediate product (TPU-ZP).

15. The process of claim 14, wherein the shaped article is a shoe or a part of a shoe.

16. The process of claim 14, wherein the shaped article comprises a pure or welded expanded thermoplastic polyurethane.

17. The process of claim 14, wherein the shaped article comprises at least 85% by weight of a thermoplastic polyurethane.

18. The process of claim 14, wherein the shaped article comprises at least 95% by weight of a thermoplastic polyurethane.

19. The process of claim 14, wherein, in the agglomeration of (iii), a temperature is below 200° C.

20. The process of claim 15, wherein, for the agglomeration of (iii), said process employs an apparatus comprising a conveying screw having a feed and an annular compression space, wherein the conveying screw passes feed material axially into the compression space.

21. A thermoplastic polyurethane obtained or obtainable by the process of claim 1.

22. A process for producing a component, the process comprising:
   obtaining a thermoplastic polyurethane by a process comprising:
      (a) reacting a thermoplastic polyurethane (TPU-1) or a polyurethane mixture comprising TPU-1 with a compound (V1) having two hydroxyl groups to obtain a mixture (G-a) comprising a thermoplastic polyurethane (TPU-2), wherein an average molecular weight of TPU-2 is less than an average molecular weight of TPU-1; and (b) reacting G-a with a mixture (G-b) comprising an isocyanate composition (ZI) comprising a diisocyanate and optionally a polyol composition (ZP) comprising a polyol (P2) to obtain a thermoplastic polyurethane (TPU-target), wherein a proportion of ZI and ZP is matched to a hard segment content of TPU-1, V1 and a hard segment content of TPU-target, and a proportion of ZI, ZP and V1 is matched to the hard segment content of TPU-1 via formula (1):

$$HSC_{G\text{-}c}=(HSC_{TPU\text{-}target}-w_{TPU\text{-}1}*HSC_{TPU\text{-}1})/(1-w_{TPU\text{-}1}) \quad (1),$$

where $HSC_{G\text{-}c}$=a hard segment content of a mixture (G-c), wherein G-c=G-b+V1, $HSC_{TPU\text{-}target}$=a hard segment content of the obtained TPU-target, $w_{TPU\text{-}1}$=a mass fraction of TPU-1, based on a total mass of TPU-1 and G-c, and $HSC_{TPU\text{-}1}$=the hard segment content of TPU-1; and processing said thermoplastic polyurethane thereby obtaining said component;

wherein said component is an extruded, injection molded or pressed article, a foam, a cable sheathing, a hose, a profile, a drive belt, a fiber, a nonwoven, a film, a molding, a sole, a sporting good, a shoe, a plug, a housing, or a damping element.

* * * * *